United States Patent [19]

Kubota

[11] Patent Number: 4,560,208
[45] Date of Patent: Dec. 24, 1985

[54] BRAKE PRESSURE CONTROL UNIT OF DECELERATION-RESPONSIVE TYPE

[75] Inventor: Hitoshi Kubota, Minamiashigara, Japan

[73] Assignee: Nissan Motor Co., Ltd., Yokohama, Japan

[21] Appl. No.: 517,410

[22] Filed: Jul. 26, 1983

[30] Foreign Application Priority Data

Jul. 27, 1982 [JP] Japan ............... 57-130843
Feb. 24, 1983 [JP] Japan ............... 58-28625

[51] Int. Cl.[4] .............................................. B60T 8/14
[52] U.S. Cl. ................................. 303/6 C; 303/24 F
[58] Field of Search ............ 303/6 C, 6 A, 24 R, 303/24 A, 24 F, 24 C; 188/349

[56] References Cited

U.S. PATENT DOCUMENTS

| | | | |
|---|---|---|---|
| 3,825,303 | 7/1974 | Vabuta | 303/6 C |
| 3,944,292 | 3/1976 | Doi et al. | 303/24 F |
| 4,141,596 | 2/1979 | Takeshita et al. | 303/24 F |
| 4,254,996 | 3/1981 | Nogami | 303/6 C |
| 4,284,307 | 8/1981 | Kubota et al. | 303/6 C |
| 4,325,582 | 4/1982 | Kuboto et al. | 303/24 F |

Primary Examiner—Duane A. Reger
Assistant Examiner—Alvin Oberley
Attorney, Agent, or Firm—Schwartz, Jeffery, Schwaab, Mack, Blumenthal & Evans

[57] ABSTRACT

A brake pressure control unit of the deceleration-responsive type comprises a control valve operable to restrict the transfer of fluid pressure therethrough from an inlet port to an outlet port and biased by a spring to a position of opening, a storing chamber operatively connected to the control valve in a manner to assist the bias of the control valve spring with an increasing force as the fluid pressure in the storing chamber increases, a deceleration-responsive valve operable to sealingly close the storing chamber in response to a vehicle deceleration at a rate exceeding a predetermined value, and a differential pressure valve disposed between the deceleration-responsive valve and the storing chamber to restrict the transfer of fluid pressure therethrough. The differential pressure valve is adapted to open in response to a varying fluid pressure that varies with the variation of the rate of fluid pressure at the inlet port.

11 Claims, 8 Drawing Figures

BRAKE PRESSURE CONTROL UNIT OF DECELERATION-RESPONSIVE TYPE

BACKGROUND OF THE INVENTION

1. Field of the Invention

The present invention relates in general to automotive brake systems and particularly to a brake pressure control unit of the deceleration-responsive type for use in an automotive brake system.

2. Description of the Prior Art

During braking or deceleration of a vehicle, a portion of the weight borne by the rear wheels is transferred to the front wheels. For this reason, the rear wheels are more likely to be locked than the front wheels if the front and rear brakes are pressurized equally. The premature locking of the rear wheels can result in a so-called dangerous skidding causing the driver to lose control of the vehicle. For avoiding this dangerous locking of the rear wheels, it has been practiced to dispose a brake pressure control valve or unit in the rear brake systems for the purpose of controlling the hydraulic or fluid pressure applied to the rear wheel brake cylinders.

A so-called proportioning valve or limiting valve is one of the well-known examples of this kind of control valve and which is adapted to effect such a control that the rear wheel brake cylinder pressure increases more gently than the front wheel brake cylinder pressure after reaching to a predetermined pressure, generally called a critical pressure or change-over pressure. Such a control valve is constructed so that the change-over pressure is maintained constant and thus effects a constant distribution of the braking force irrespective of the variation of the load on the vehicle.

As is known, however, an ideal distribution of the braking force that causes the front and rear wheels to be locked simultaneously varies with the variation of the load on the vehicle. In order to attain such an ideal distribution of the braking force, it is therefore necessary for the brake pressure control valve or unit to be constructed such that the change-over pressure is variable depending upon the variation of the load on the vehicle, viz., the change-over pressure increases with the increase of the load on the vehicle.

A brake pressure control unit of the deceleration-responsive type was proposed for attaining this end, which is provided with a storing chamber to which a master cylinder pressure is supplied to compress or decompress a spring of a control valve for thereby increasing or reducing the change-over pressure that is determined by the force of the control valve spring. The master cylinder pressure supplied to the storing chamber is sealingly stored therein by the closure of a deceleration-responsive valve in response to a vehicle deceleration at a rate exceeding a predetermined value. By the closure of the deceleration-responsive valve, the storing chamber pressure is thus maintained constant irrespective of the further increase of the master cylinder pressure, maintaining the force of the control valve spring and therefore the change-over pressure constant. From this time onward, the further increase of the master cylinder pressure causes the rear wheel brake cylinder pressure to increase more gently than the front brake cylinder pressure. The change-over pressure thus can be varied with the increase of the load on the vehicle since the master cylinder pressure increases with the increase of the load on the vehicle.

This deceleration-responsive type brake pressure control unit is intended to effect such a control of the rear wheel brake cylinder pressure as is shown in FIG. 5. That is, when the vehicle is empty, such a distribution of the braking force that is represented by the line a - b - c (change-over pressure $Ps_1$) is obtained. On the other hand, when the vehicle is in a certain loaded condition, such a distribution of the braking force that is represented by the line a - b' - c' (change-over pressure $Ps_2$) is obtained.

However, this brake pressure control valve unit cannot provide such an intended control of the rear wheel brake cylinder pressure. That is, when the master cylinder pressure is increased at a rate as indicated by $\alpha$ in FIG. 6, the resulting rate of vehicle deceleration is retarded as indicated by $\beta$. Thus, in the case of the above-mentioned brake pressure control valve unit wherein the storing chamber is adapted to be supplied with the master cylinder pressure as it is, the fluid pressure sealingly stored in the storing chamber by the closure of the deceleration-responsive valve does not correspond to the loaded condition of the vehicle but becomes too high. For this sake, the change-over pressure actually effected by the above-mentioned deceleration-responsive type brake pressure control unit becomes higher than the intended pressure as for example indicated by $Ps_1$ and $Ps_2$ in FIG. 5 and are displaced from the intended point b or b' to the point d or e as shown in FIG. 5.

To solve this problem, it has been proposed to dispose a pressure-reducing valve in the fluid passage leading to the storing chamber, intending to supply to the storing chamber such a fluid pressure that is smaller than the master cylinder pressure by a certain constant amount and thereby to retard the increase of the storing chamber pressure relative to the master cylinder pressure by the amount corresponding to the time t by which the vehicle deceleration is retarded to occur after application of the brake.

With this countermeasure, the intended result is obtained only when the rate of increase of the master cylinder pressure is such particular one as represented by $\alpha$ in FIG. 6 and cannot be obtained when the rate of increase of the master cylinder pressure is slower as represented by $\alpha'$ in FIG. 7 or faster as presented by $\alpha''$ in FIG. 8. This is because the vehicle deceleration is retarded to occur by a constant time t for any rate of increase of the master cylinder pressure, as represented by $\beta'$ and $\beta''$ in FIGS. 7 and 8, while the above-mentioned pressure-reducing valve is adapted to supply to the storing chamber such a pressure ($\delta'$ or $\delta''$ in FIGS. 7 or 8) that is smaller than the master cylinder pressure ($\alpha'$ or $\alpha'$ in FIGS. 7 or 8) by a constant amount $\gamma$. For this sake, the time by which the increase of the storing chamber pressure is retarded relative to the master cylinder pressure cannot always correspond to the time by which the vehicle deceleration is retarded to occur after application of the brake. By the use of such a pressure-reducing valve, it has therefore been impossible to make the storing chamber pressure precisely correspond to the loaded condition of the vehicle under any vehicle deceleration rate and for this reason it has been impossible to attain a proper distribution of the braking force at all times under any operating condition of the vehicle.

SUMMARY OF THE INVENTION

It is, therefore, an object of the present invention to provide a brake pressure control unit of the type referred to hereinabove which avoids the above noted shortcomings of the prior art device and in which the storing chamber pressure precisely corresponds to the loaded condition of the vehicle under any vehicle deceleration rate.

A feature of the present invention is the provision of a brake pressure control unit of the deceleration-responsive type comprising: a housing having an inlet port and an outlet port; a control valve disposed in the housing between the inlet and outlet ports and operable to restrict the transfer of fluid pressure therethrough, the control valve having a spring by which it is biased to a position of opening; a storing chamber disposed in the housing and communicable with the inlet port, the storing chamber being variable in volume depending upn the variation of the fluid pressure supplied thereto and operatively connected to the control valve in a manner to assist the bias of the control valve spring with an increasing force as the fluid pressure in the storing chamber increases; a deceleration-responsive valve disposed in the housing between the inlet port and the storing chamber and operable to sealingly close the storing chamber in response to a vehicle deceleration at a rate exceeding a predetermined value; and a differential pressure valve disposed in the housing between the deceleration-responsive valve and the storing chamber and operable to restrict the transfer of fluid pressure therethrough, the differential pressure valve being constructed so that its valve opening pressure at which it opens to allow the transfer of fluid pressure therethrough varies with the variation of the rate of increase of the fluid pressure at the inlet port.

By the provision of the differential pressure valve of which the valve opening pressure varies with the variation of the rate of increase of the inlet port pressure, the storing chamber pressure can be controlled so as to precisely correspond to the loaded condition of the vehicle under any vehicle deceleation rate.

In accordance with a preferred improvement of the subject matter of this invention, the actuator of the differential pressure valve is adapted to be acted upon at the opposed axial ends thereof by such pressures that are counterbalanced. This is quite effective for making the storing chamber pressure further precisely correspond to the loaded condition of the vehicle under any deceleration rate.

BRIEF DESCRIPTION OF THE DRAWINGS

The features and advantages of the brake pressure control unit according to the present invention will become more clearly appreciated from the following description taken in conjunction with the accompanying drawings, in which.

DETAILED DESCRIPTION OF THE PREFERRED EMBODIMENTS

Figure 1:
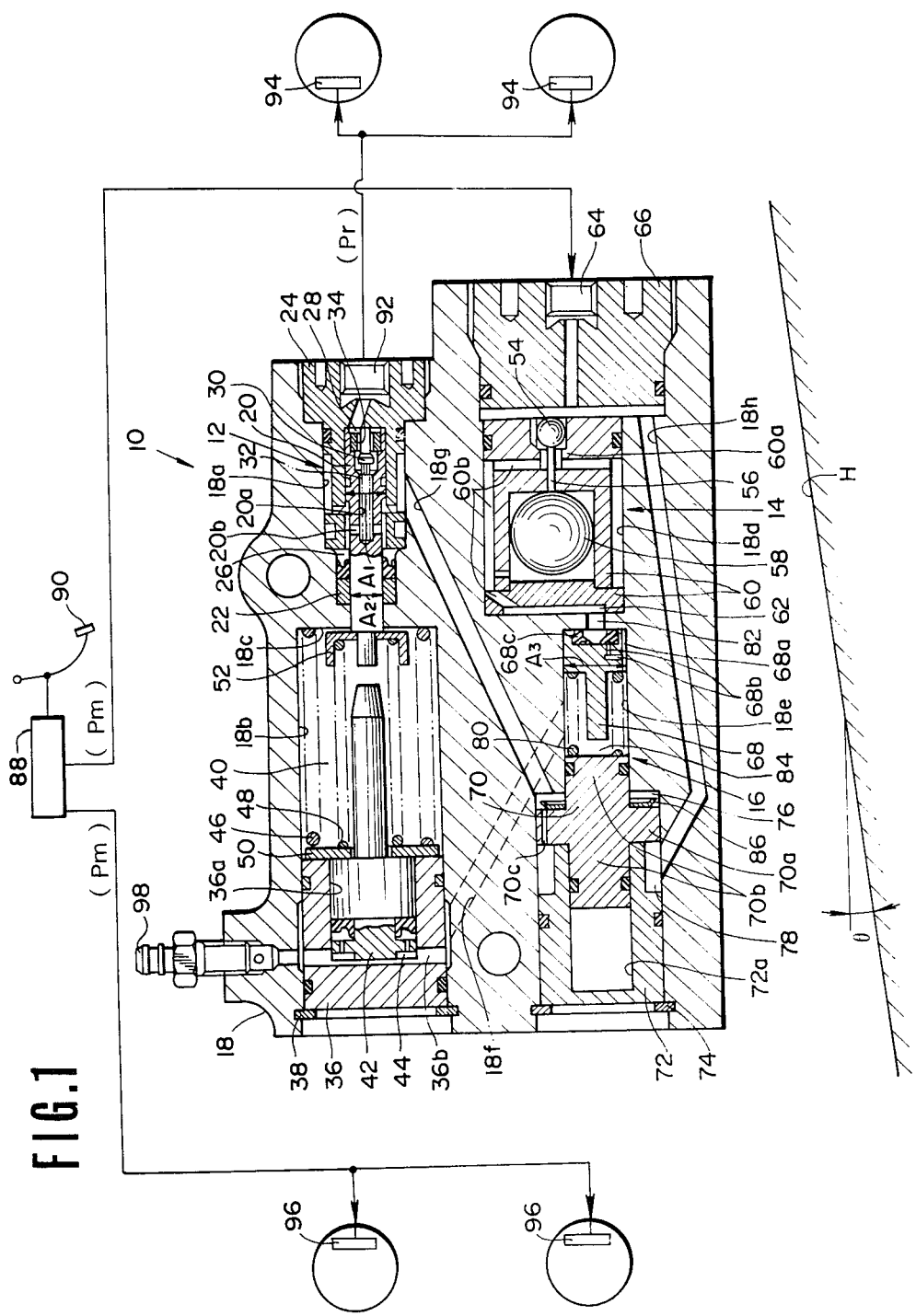
FIG. 1 is a longitudinal sectional view of a first embodiment of a brake pressure control unit in accordance with the present invention, the unit being shown in association with a diagrammatically illustrated brake system.

Referring to FIG. 1, in particular, the first embodiment of the brake pressure control unit is generally designated by 10 and shown as comprising a control valve 12, a deceleration-responsive valve 14 and a differential pressure valve 16 which are disposed within a housing 18.

The control valve 12 is shown in this embodiment as a proportioning valve and includes a stepped piston or plunger 20 which is axially movably mounted in a stepped bore 18a of the housing 18 by means of a guide ring 22 and a plug 24 in a manner to define first and second control valve chambers 26 and 28. That is, the plunger 20 is axially movably carried in the guide ring 22 and the plug 24 which are fitted in the bore 18a of the housing 18. The plunger 20 is formed with a blind bore 20a which is in communication with the first control valve chamber 26 through a radial bore 20b which is also formed in the plunger 20. Mounted within the blind bore 20a is a poppet valve member 30 which is biased by a spring 32 to a position where it seats on a valve seat 34 to close the port thereof. The valve seat 34 is fitted in the right-hand end of the blind bore 20a and is movable together with the plunger 20. The poppet valve member 30 has such a stem portion that is long enough to be pushed by the plug 24 into the blind bore 20a when the plunger 20 assumes the rightest possible position as shown in the drawing, causing the poppet valve member proper to be unseated from the valve seat 34 to open the port thereof.

The stepped bore 18a of the housing 18 terminates at the left-hand end thereof in a bore 18b which is axially aligned with the bore 18a. The left-hand end of the bore 18b is closed by a closure member 36 which is retained by a clip 38, thereby defining an air chamber 40 in communication with the open air. The closure member 36 is formed with a blind bore 36a in which a piston 42 is axially movably received in a manner to define a storing chamber 44 which is variable in volume depending upon axial movement of the piston 42. A pair of springs 46 and 48 are concentrically disposed within the air chamber 40 for operatively connecting the piston 42 to the plunger 20. That is, the larger diameter spring 46 is arranged to seat at an end on a housing wall 18c defining an end of the air chamber 40 and at the other end on a spring seat 50 mounted on the piston 42. On the other hand, the smaller diameter spring 48 is arranged to seat at an end on a spring seat 52 mounted on the left-hand end of the plunger 20 projecting into the air chamber 40 and at the other end on the spring seat 50. The springs 46 and 48 are installed in preloaded conditions so that the plunger 20 and the piston 42 are constantly biased in opposite directions.

The deceleration-responsive valve 14, which is generally called a gravity valve, includes a ball valve member 54, a gravity ball 58 movable within a ball holder 60 and a rod 56 axially movable in the ball holder 60 and abuttingly engaged at opposed ends thereof with the ball valve member 54 and the gravity ball 58. The ball holder 60 is formed with a valve seat 60a for the ball member 54 and also with a passage 60b for fluidly connecting the port of the valve seat 60a to a chamber 62. The port of the valve seat 60a is also communicated with an inlet port 64 formed in a plug 66. The plug 66 is screwed into the housing 18 to close an end of a bore 18d in which the ball holder 60 is received.

The differential pressure valve 16 includes a differential pressure valve member 68 and an actuator 70 which are mounted within a stepped bore 18e of the housing 18. The stepped bore 18e is formed in the housing 18 at a place next to the bore 18d for the deceleration-responsive valve 14. The valve member 68 is axially movable in a smaller diameter section of the bore 18e. The actuator 70 takes the form of a stepped piston and has a larger diameter portion 70a and two smaller diameter portions 70b on the respective sides of the larger diameter portion. The right-hand smaller diameter portion 70b is sealingly and axially movably received in the smaller diameter section of the bore 18e, while the left-hand smaller diameter portion 70b is sealingly and axially movably received in a blind bore 72a of a closure member 72 which closes the left-hand end of the bore 18e and is retained by a clip 74. The larger diameter portion 70a of the actuator 70 is positioned within a larger diameter section of the bore 18e and defines on the respective sides thereof first and second actuator chambers 76 and 78. Interposed between the valve member 68 and the actuator 70 is a spring 80 which is installed in a preloaded condition to urge the both in opposite directions and yieldingly hold them in the illustrated positions in the drawing where they are remotest from each other. When held in the illustrated position, the valve member 68 closes a port 82 in communication with the chamber 62. When, however, moved leftwardly from the illustrated position, the valve member 68 allows the port 82 to communicate through its peripheral groove 68a with a chamber 84 defined between the actuator 70 and the valve member 68.

The chamber 84 is communicated with the storing chamber 44 through a passage 18f of the housing 18 and through a radial hole 36b of the closure member 36. The first actuator chamber 76 on the right-hand side of the larger diameter portion 70a is communicated with the first control valve chamber 26 through a passage 18g formed in the housing 18, while the second actuator chamber 78 on the left-hand side of the larger diameter portion 70a of the actuator 70 is communicated with the inlet port 64 through a passage 18h formed in the housing 18. The larger diameter portion 70a of the actuator 70 is formed with an orifice 70c which establishes communication between the first and second actuator chambers 76 and 78. A bimetal member 86 in the form of an annular plate is mounted on the right-hand smaller diameter portion 70b of the actuator 70 in such a manner that its outer peripheral portion is opposed closely to the right-hand end of the orifice 70c. The bimental member 86 is operative to restrict fluid flow through the orifice 70c increasingly as the temperature of the fluid increases so that the orifice effect of the orifice 70c is maintained constant without being affected by a viscosity variation of the fluid resulting from a temperature variation.

In installation, the inlet port 64 is connected to one of the outlet ports of a tandem master cylinder 88 which is operated by a brake pedal 90. The plug 24 which is screwed into the housing 18 to sealingly close an end of the bore 18a is formed with an outlet port 92 opening to the second control valve chamber 28. The outlet port 92 is connected to rear wheel brake cylinders 94. The other outlet port of the tandem master cylinder 88 is connected to front wheel brake cylinders 96. The brake pressure control unit 10 is mounted on a vehicle body (not shown) in a manner to slant an angle $\theta$ with respect to a horizontal plane H such that the ball valve member 54 is normally held unseated from the valve seat 60a due to the gravity of the gravity ball 58 so far as the rate of vehicle deceleration does not exceed a predetermined value. The brake pressure control unit 10 is also mounted in such a manner that its longitudinal axis extends along the front-to-rear direction of the vehicle so that upon deceleration of the vehicle the gravity ball 58 is subjected to forces that urge the gravity ball to move leftwardly in the drawing. Designated by the reference numeral 98 is an air bleed valve fluidly connected to the radial hole 36b.

The operation of the brake pressure control unit 10 will now be described hereinafter. FIG. 1 shows an inoperative condition of the brake pressure control unit 10, viz., a condition to which the brake pressure control unit 10 is put when it is not operated. When the brake pedal 90 is depressed to actuate the master cylinder 88, a fluid pressure Pm is discharged from the both outlet ports of the master cylinder 88 simultaneously. The fluid pressure Pm from one outlet port is supplied as it is, directly and constantly to the front wheel brake cylinders 96, while the fluid pressure from the other outlet port is supplied at the first step of braking action as it is, to the rear wheel brake cylinders 94 through the inlet port 64, passage 18h, second actuator chamber 78, orifice 70c, first actuator chamber 76, passage 18g, first control valve chamber 26, radial bore 20b, blind bore 20a, valve seat 34 port, second control valve chamber 28 and through the outlet port 92. Thus, at the first step of braking action, the rear wheel brake pressure Pr to be supplied to the rear wheel brake cylinders 94 is equal to the master cylinder pressure Pm and therefore to the front wheel brake pressure. The rear wheel brake pressure Pr thus increases along the characteristic slope a—b shown in FIG. 5 at the initial stage of braking action.

Assuming that the sectional area of the bore of the guide ring 22 is $A_2$, and the force of the spring 48 is F, the following formula will describe the relationship of the forces acting on the plunger 20 at the first step of braking action, ignoring the effect of the light compression spring 32:

$$Pm \cdot A_2 \leq F$$

Thenceforth, when the brake pedal 90 is depressed to further increase the master cylinder pressure Pm, the value of the left-hand term of the above formula becomes larger than the right-hand term (that is, $Pm \cdot A_2 > F$). This causes the plunger 20 to move leftwardly in the drawing against the bias of the spring 48, allowing the poppet valve member 30 to move toward the valve seat 34 and eventually seat thereon to close the port thereof. From this time onward, further increase of the rear wheel brake pressure Pr is restricted in a manner as will be described hereinafter as compared with the front wheel brake pressure Pm. The critical pressure or change-over pressure $P_{s1}$ at which the above-mentioned restriction begins can be obtained from the following equation:

$$P_{s_1} = \frac{F}{A_2} \quad (1)$$

When the poppet valve member 30 closes the port of the valve seat 34 as above, the master cylinder pressure Pm comes to urge the plunger 20 in the adverse direction, viz., rightwardly in the drawing, with a force $Pm(A_1-A_2)$ wherein $A_1$ represents the sectional area of the portion of the plunger 20 received in the plug 24 and is larger than $A_2$ (that is, $A_1>A_2$), opposing to the rear wheel brake pressure Pr in the second control valve chamber 28 which urges the plunger 20 leftwardly in the drawing with a force $Pr \cdot A_1$. Thenceforth, further depression on the brake pedal 90 for attaining $Pm>P_{s1}$ causes the plunger 20 to move rightwardly in the drawing with the above-mentioned force resulting from the master cylinder pressure Pm and the force F of the spring 48, allowing the poppet valve member 30 to be unseated from the valve seat 34 to open the port thereof again. When the poppet valve member 30 is held in a position of opening the port of the valve seat 34, the rear wheel brake pressure Pr increases. However, with the port of the valve seat 34 being open, the master cylinder pressure Pm comes to urge the plunger 20 leftwardly in the drawing again. The poppet valve member 30 thus closes the port of the valve seat 34 again immediately. By the repetition of the above-mentioned operation of the poppet valve member 30, the increase of the rear wheel brake pressure Pr is restricted. That is, the rear wheel brake pressure Pr increases more slowly or gradually relative to the master cylinder pressure Pm.

When $Pm>P_{s1}$, the following equation will describe the relationship of the forces acting on the plunger 20, ignoring the effect of the spring 32:

$$Pr \cdot A_1 = Pm(A_1-A_2) + F \quad (2)$$

From this, the following equation results for obtaining the rear wheel brake pressure Pr:

$$Pr = \frac{A_1 - A_2}{A_1} P_m + \frac{F}{A_1} \quad (3)$$

Figure 5:
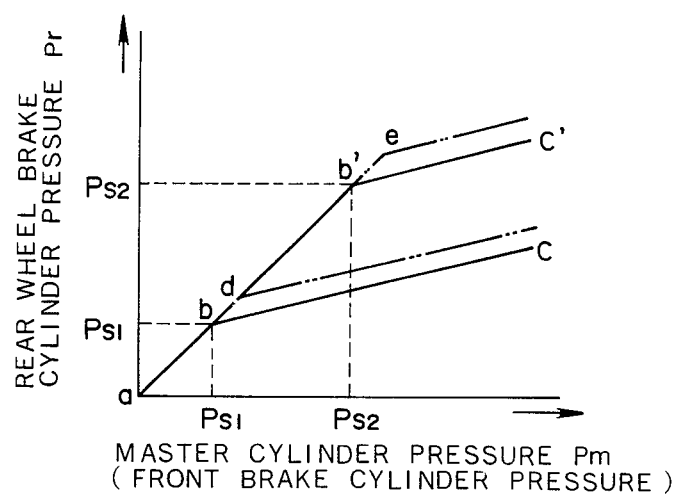
FIG. 5 is a graph illustrating the rear wheel brake cylinder pressure as a function of the master cylinder pressure, for the brake pressure control unit of this invention, the two dot-chain lines indicating the characteristic slopes effected by the comparable prior art brake pressure control unit.

As is clear from the equation (3), when $Pm>P_{s1}$, the rear wheel brake pressure Pr increases at a slope of $$\frac{A_1 - A_2}{A_1},$$

which is smaller than the slope of the line a - b of FIG. 5, as represented by the line b - c of FIG. 5, making it possible to attain such a distribution of the braking force that is effective to prevent premature rear wheel skidding or locking when a vehicle is empty or in a non-loaded condition.

In the meantime, the master cylinder pressure Pm is also supplied from the inlet port 64 to the port 82 through the port of the valve seat 60a, passage 60b and chamber 62. The master cylinder pressure Pm having reached to the port 82 acts on the right-hand end of the differential pressure valve member 68 to urge same leftwardly in the drawing. When, however, the master cylinder pressure Pm is smaller than a predetermined valve opening pressure of the differential pressure valve 16 which is determined by the strength of the spring 80, the valve member 68 is held in a position where it closes the port 82. When the master cylinder pressure Pm exceeds the valve opening pressure, the valve member 68 is moved against the spring 80 leftwardly in the drawing to open the port 82, thus allowing the master cylinder pressure Pm to reach to the storing chamber 44 through the peripheral groove 68a, chamber 84, passage 18f and radial hole 36b. However, immediately after the opening of the port 82 the valve member 68 returns to the initial position where it closes the port 82 again since the master cylinder pressure Pm comes to act on the both end faces of the valve member 68 when the port 82 is open. By the repetition of the above-mentioned operation of the valve member 68, the differential pressure valve 16 supplies to the storing chamber 44 such a pressure that is obtained by the following equation:

$$Pf = Pm - \frac{F'}{A_3} \quad (4)$$

where $A_3$ is the sectional area of the bore of the chamber 84 and F' is the force of the spring 80.

As is apparent from the equation (4), the fluid pressure Pf supplied to the storing chamber 44 is smaller than the master cylinder pressure Pm by the amount of $F'/A_3$ which is determined by the force F' of the spring 80.

When the vehicle decelerates at a rate exceeding a predetermined value, the gravity ball 58 moves leftwardly in the drawing together with the rod 56 and the ball valve member 54, allowing the ball valve member to seat on the valve seat 60a to close the port thereof. By this operation of the deceleration-responsive valve 14 and the above-mentioned operation of the differential pressure valve 16, such a fluid pressure Pf is sealingly stored in the storing chamber 44 that is obtained by subtracting the above-mentioned amount of $F'/A_3$ from the master cylinder pressure Pm. In this connection, it is to be noted that the depression on the brake pedal 90 and therefore the master cylinder pressure Pm required for attaining a given rate of vehicle deceleration increases with the increase of the load on the vehicle. Thus, the storing chamber pressure Pf increases as the load on the vehicle increases. When the vehicle is empty or in a non-loaded condition, the storing chamber pressure Pf does not become so large as to move the piston 42 rightwardly in the drawing prevailing the forces of the springs 46 and 48. The piston 42 is thus held in the position illustrated in the drawing, and the forces of the springs 46 and 48 acting on the plunger 20 are maintained at preset value. Accordingly, when the vehicle is empty or in a non-loaded condition, such a distribution of the braking forces that is represented by the line a - b - c of FIG. 5 is obtained as intended.

On the other hand, when the vehicle is in a loaded or fully loaded condition, the fluid pressure Pf in the storing chamber 44 increases and causes the piston 42 to move against the springs 46 and 48 rightwardly in the drawing by the amount proportional to the load on the vehicle, thereby increasing the force F of the spring 48. By this, the change-over pressure that is obtained from the equation (1) is increased from $P_{s1}$ to $P_{s2}$, as shown in FIG. 5, for a given load on the vehicle, whereby such a distribution of the braking forces that is represented by the line a - b' - c' of FIG. 5 is obtained as intended.

Figure 7:
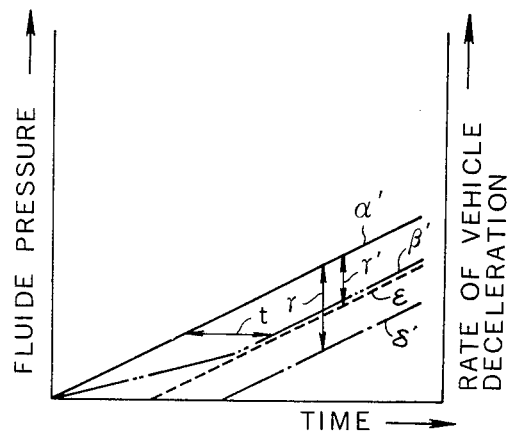

In the meantime, the master cylinder pressure Pm is adapted to be supplied through the orifice 70c of the actuator 70 to the control valve 12. By the effect of this orifice 70c, the working fluid is subjected to such flow resistance that causes a difference in pressure between the first and second actuator chambers 76 and 78 (that is, the pressure in the second actuator chamber 78 becomes larger than that in the first actuator chamber 76). This pressure difference increases as the rate of increase of the master cylinder pressure Pm (working fluid flowing speed) becomes larger and applies such a force on the actuator 70 that urges the actuator rightwardly in the drawing. However, in the case where the rate of increase of the master cylinder pressure Pm is small as represented by the line α' in FIG. 7, the above-mentioned rightward force acting on the actuator 70 does not become so large as to prevail the force of the spring 80, thus allowing the actuator 70 to be held in the illustrated position and maintaining the force of the spring 80 at a preset value. By this, the valve opening pressure of the differential pressure valve 16 that is determined by the force of the spring 80 is set low. When this is the case, the storing chamber pressure Pf that is obtained from the foregoing equation (4) varies as represented by the line ε in FIG. 7, thus making it possible to make the pressure difference γ' between the master cylinder pressure Pm and the storing chamber pressure Pf smaller than the corresponding difference γ in the comparable prior art device (δ' in FIG. 7 indicates the variation of the storing chamber pressure of the comparable prior art device operated under the corresponding condition).

Figure 6:
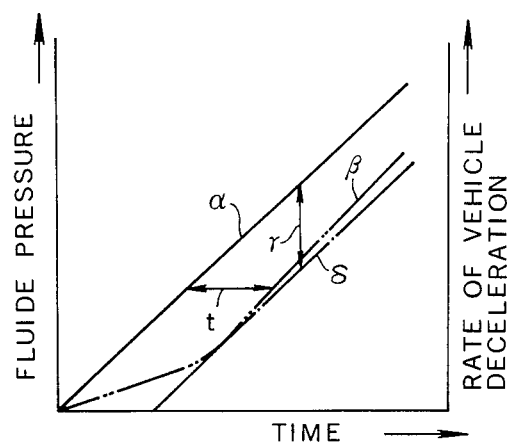
FIGS. 6 to 8 are graphs illustrating the several rates of increase of the master cylinder pressures and the resulting vehicle deceleration rates, together with the rates of increase of the storing chamber pressures, for the brake pressure control unit of this invention, the one-dot chain lines indicating the rates of increase of the storing chamber pressure for the prior art braking pressure control unit.

In the case where the rate of increase of the master cylinder pressure Pm is larger as represented by the line α in FIG. 6, the difference in pressure between the first and second actuator chambers 76 and 78 becomes larger by the corresponding amount and allows the actuator 70 to move rightwardly from the illustrated position by the amount corresponding to the rate of increase of the master cylinder pressure Pm, prevailing the bias of the spring 80. As a result, the force F' of the spring 80 is increased to make the valve opening pressure of the differential pressure valve 16 larger, thus allowing the storing chamber pressure Pf that is obtained from the equation (4) to vary as represented by the line δ in FIG. 6. The line representing the variation of the storing chamber pressure of the comparable prior art device operated under the corresponding condition coincides with the line δ.

Figure 8:
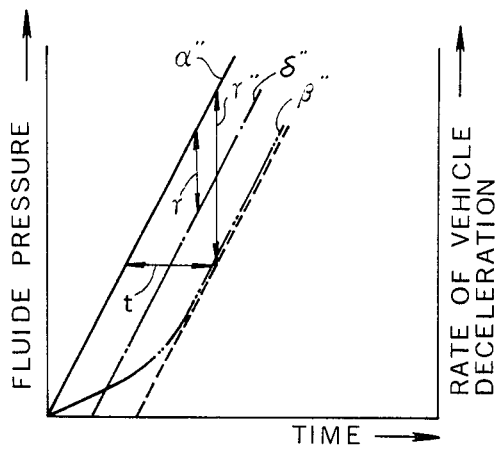

In the case where the rate of increase of the master cylinder pressure Pm is further larger as represented by the line α'' in FIG. 8, the difference in pressure between the first and second actuator chambers 76 and 78 becomes further larger and allows the actuator 70 to move further rightwardly from the above-mentioned rightwardly displaced position. As a result, the force F' of the spring 80 is further increased to make the valve opening pressure of the differential pressure valve 16 that is determined by the spring force F', larger. When this is the case, the storing chamber pressure Pf that is obtained from the foregoing equation (4) varies as represented by the line ε' in FIG. 8, thus making it possible to make the pressure difference γ'' between the master cylinder pressure Pm and the storing chamber pressure Pf larger than the corresponding difference γ in the comparable prior art device (δ'' in FIG. 8 indicates the variation of the storing chamber pressure of the comparable prior art device operated under the corresponding condition).

As seen from the graphs of FIGS. 5 to 8, the development of the pressure Pf in the storing chamber 44 is retarded relative to the master cylinder pressure Pm by a substantially constant time t, for any rate of increase of the master cylinder pressure Pm, whereby when the vehicle is decelerated at any rate, that is, for any rate of increase of the master cylinder pressure, the storing chamber pressure Pf that is sealingly stored in the storing chamber 44 by the closure of the deceleration-responsive valve 14 can be varied in a manner to precisely correspond to any loaded condition of the vehicle, thus making it possible to attain a proper distribution of the braking force under any vehicle decelerating condition.

In the meantime, when the depression on the brake pedal 90 is released, the master cylinder pressure Pm disappears. When this is the case, the storing chamber pressure is vented through the peripheral groove 68a and a passage 68b of the differential pressure valve member 68, deforming the seal 68c to make it uncover the mouth of the passage 68b. The storing chamber 44 thus can prepare for the next operation.

From the foregoing, it is to be understood that the brake pressure control valve unit 10 of this invention is provided with the differential pressure valve 16 which is disposed in the passage 18f interconnecting the storing chamber 44 and the deceleration-responsive valve 14 to normally shut off the passage 18f and of which the valve opening pressure is adapted to vary depending upon the rate of increase of the pressure at the inlet port 64 (master cylinder pressure Pm) such that the development of the storing chamber pressure Pf is retarded relative to the inlet port pressure Pm by such a time t that corresponds precisely to the time by which the vehicle deceleration is retarded to occur after development of the master cylinder pressure Pm (inlet port pressure), that is, after application of the brake, thus enabling the storing chamber pressure Pf that is sealingly stored in the storing chamber 44 upon closure of the deceleration-responsive valve 14, to precisely correspond to the loaded condition of the vehicle under any vehicle deceleration rate and thereby making it possible to attain a proper distribution of the braking force under any operating condition of the vehicle, that is, under any loaded or decelerating condition of the vehicle.

It will also be understood that the bimetal member 86 that maintains the orifice effect constant is quite effective for assuring the above-mentioned effects of the brake pressure control unit 10 even if it is operated under any temperature condition.

Figure 2:
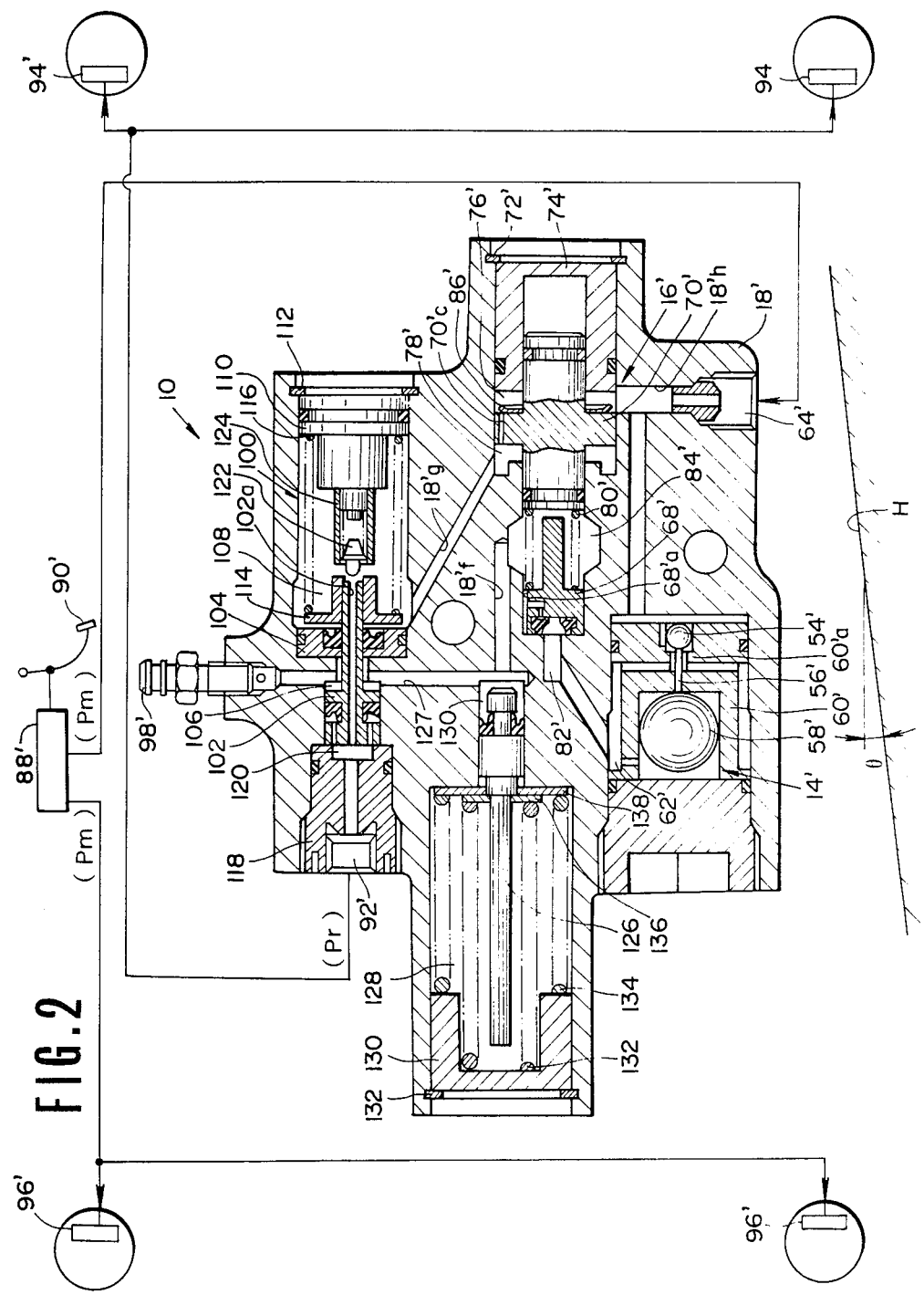
FIGS. 2 to 4 are views similar to FIG. 1 but illustrate second to fourth embodiments in accordance with the present invention.
Figure 3:
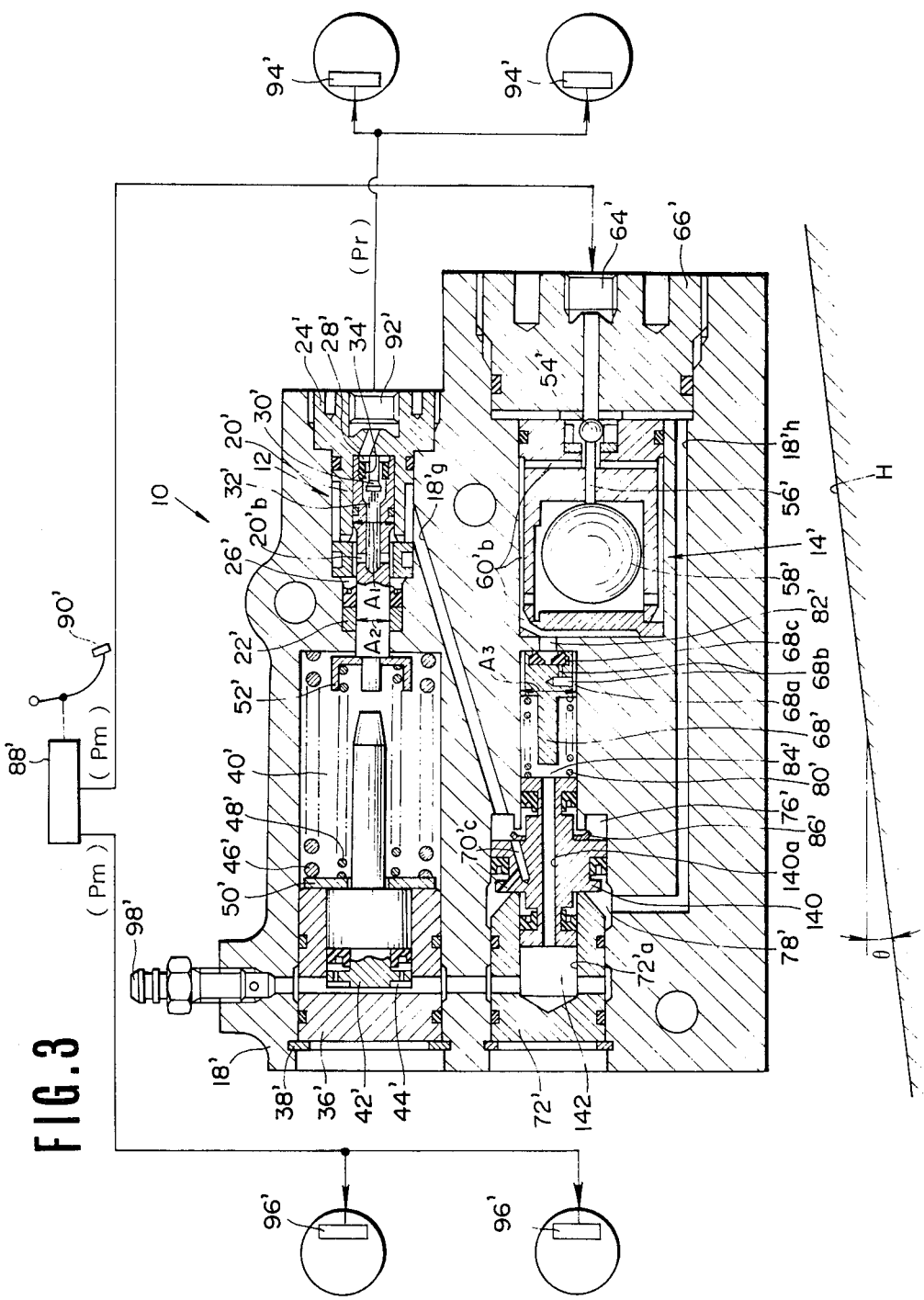
Figure 4:
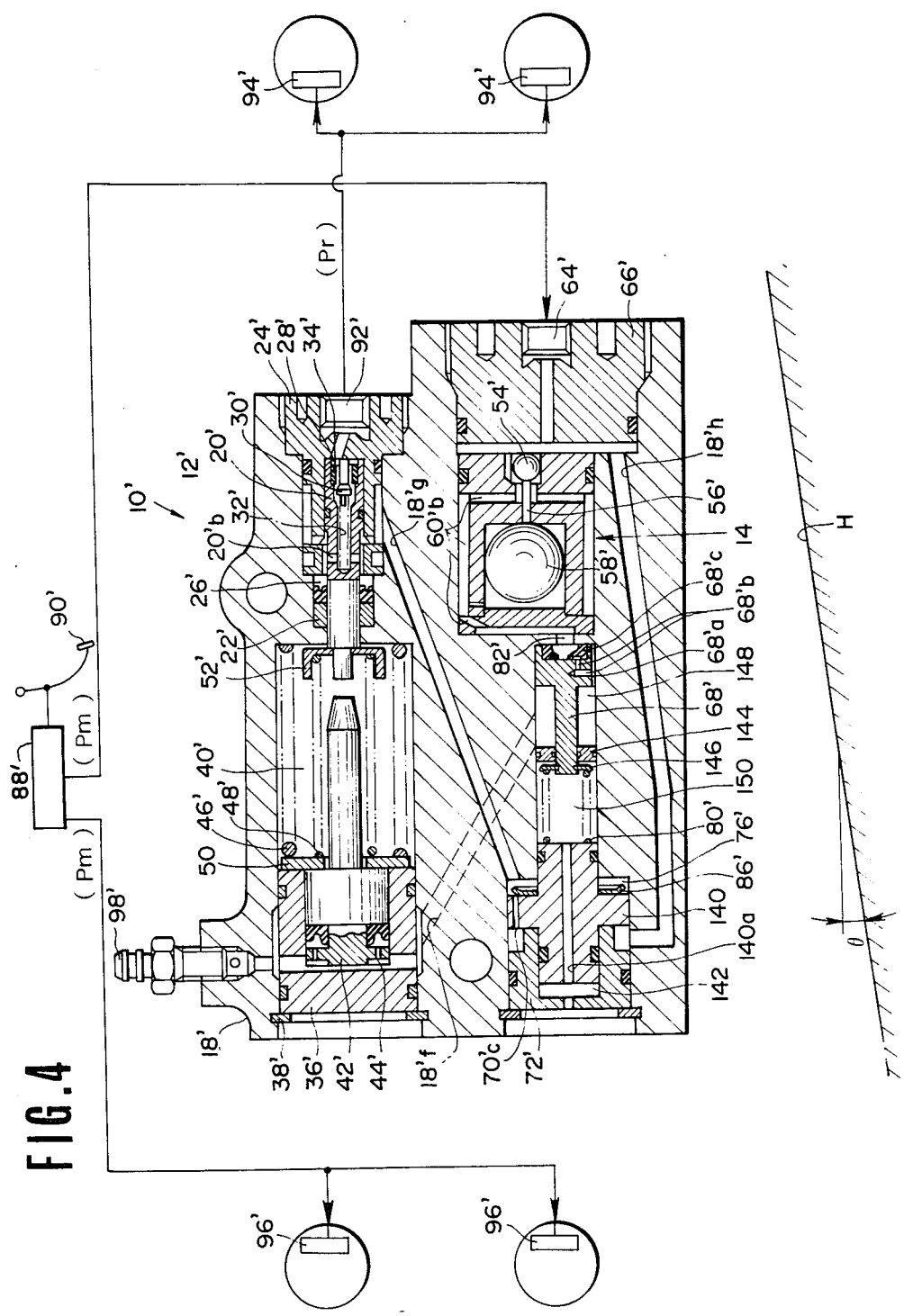

Referring to FIGS. 2 to 4 in particular, modified embodiments will be described hereinafter. In the modified embodiments, elements or parts substantially similar to or functionally identical with those of the previous embodiment are indicated by like reference numerals as their corresponding parts of the previous embodiment, with prime marks added and will not be described again for brevity.

FIG. 2 shows the second embodiment of the brake pressure control unit 10' which includes a modified control valve 100. The deceleration-responsive valve 14' and the differential pressure valve 16' are functionally identical with those of the previous embodiment though their relative arrangements are modified.

The control valve 100 includes a plunger 102 which is axially movably received within a housing 18', while being axially movably guided by a guide ring 104, in a manner to define first and second control valve chambers 106 and 108. The right-hand end of the chamber 108 is sealingly closed by a closure member 110 retained by a clip 112. Interposed between this closure member 110 and a spring seat 114 fixedly attached to the right-hand end of the plunger 102 is a compression spring 116 in a preloaded condition to urge the plunger 102 into abutment on a plug 118 that closes the left-hand end of the bore (no numeral) in which the plunger 102 is axially movably received. Defined between the plug 118 and the plunger 102 is a chamber 120 in communication with the outlet port 92'. The chamber 108 is communicated through the passage 18'g with the second actuator chamber 78'. The plunger 102 is formed with an axial hole 102a extending throughout the length thereof to provide communication between the chamber 108 and the chamber 120.

The right-hand open end of the plunger 102 is adapted to serve as a valve seat which cooperates with a poppet valve member 122 to constitute a valve. The poppet valve member 122 is axially movably received in a hollow, cylindrical holder 124 attached to the closure member 110 and is biased leftwardly to a position where it partially projects from the left-hand end of the holder 124.

The control valve 100 is accompanied by a modification in the storing chamber arrangement. That is, the control valve 100 further includes a piston 126 which is axially movably received within the housing 18' in a manner to define a storing chamber 130 in communication with the chamber 84' of the differential pressure valve 16' through the passage 18'f. The storing chamber 130 is also communicated through a passage 127 with the chamber 106. The left-hand end of the piston 126 projects into an air chamber 128 of which the left-hand end is closed by a closure member 130 retained by a clip 132. A pair of concentric springs 132 and 134 are disposed within the air chamber 128 in a manner to urge the piston 126 rightwardly in the drawing. That is, the spring 132 has an end seating on a spring seat 136 which is mounted on the piston 126 in a manner to be constantly engaged with a shoulder of the piston 126 and the other end seating on the closure member 130. The spring 134 has an end seating on a spring seat 138 which is mounted on the piston 126 in a manner to be engageable with a second shoulder of the piston 126 and the other end seating on the closure member 130.

In operation, the master cylinder pressure Pm produced by depressing the brake pedal 90 is supplied through a circuit similar to the previous embodiment, that is, through the inlet port 64', passage 18'h, first actuator chamber 76', orifice 70'c, second actuator chamber 78' and passage 18'e to the chamber 108 of the control valve 100. The master cylinder pressure Pm having reached to the chamber 108 is supplied at the first step of braking action as it is, to the rear wheel brake cylinders cylinders 94' through the axial hole 102a of the plunger 102, chamber 120 and outlet port 92'.

At the first step of braking action, the master cylinder pressure Pm thus acts on the both ends of the plunger 102 to provide a force that urges the plunger 102 rightwardly in the drawing since the left-hand end of the plunger has a sectional area larger than that of the right-hand end. The above-mentioned plunger urging force increases with the increase of the master cylinder pressure Pm. When this plunger urging force becomes large enough to prevail the force of the spring 116 and the force resulting from the storing chamber pressure Pf that reaches to the first control valve chamber 106 in a way as will described hereinafter, the plunger 102 is moved rightwardly in the drawing to allow the right-hand open end of the plunger 102 to be closed by the poppet valve member 122, thus shutting off the above-mentioned fluid passage interconnecting the inlet port 64' and the outlet port 92'. When this occurs, the master cylinder pressure Pm acts on the plunger 102 only at the right-hand end thereof to apply on same a force that urges the plunger in the adverse direction, viz., leftwardly in the drawing, thus causing the plunger 102 to move leftwardly in the drawing to open the above-mentioned fluid passage between the inlet and outlet ports 64' and 92'. By the repetition of the above-mentioned operation, the control valve 100 can control the rear wheel brake cylinder pressure substantially similarly to the previous embodiment.

During the above-mentioned operation of the brake pressure control valve unit 10', the master cylinder pressure Pm is also supplied to the storing chamber 130 after being reduced by the foregoing control of the differential pressure valve 16' by the amount corresponding to the rate of increase of the master cylinder pressure Pm. When the vehicle deceleration rate reaches to the foregoing predetermined value, the deceleration-responsive valve 14' is closed through the foregoing operation to sealingly store in the storing chamber 130 the pressure that had prevailed therein at that moment. This storing chamber pressure is variably stored in the storing chamber 130 by the effect of the piston 126 and the springs 132 and 134 and is supplied through the passage 127 to the first control valve chamber 106 to thereby urge the plunger 102 in the direction to assist the bias of the spring 118. Since this storing chamber pressure precisely corresponds to any loaded condition as well as any decelerating condition of the vehicle as having been described with respect to the previous embodiment, the brake pressure control unit 10' of this embodiment can provide a proper distribution under any operating condition of the vehicle.

This embodiment can therefore produce substantially the same effect as the previous embodiment since in this embodiment the differential pressure valve 16' is disposed in the passage 18'f interconnecting the storing chamber 130 and the deceleration-responsive valve 14' to normally shut off the passage 18'f and of which the valve opening pressure is adapted to vary depending upon the pressure at the inlet port 64' (master cylinder pressure Pm) such that the development of the storing chamber pressure Pf is retarded relative to the inlet port pressure Pm by such a time t that corresponds precisely to the time by which the vehicle deceleration is retarded to occur after development of the master cylinder pressure Pm (inlet port pressure), that is, after application of the braking force, thus enabling the storing chamber pressure Pf that is sealingly stored in the storing chamber 130 upon closure of the deceleration-responsive valve 14', to precisely correspond to any loaded condition as well as any decelerating condition of the vehicle and thereby making it possible to attain a proper distribution of the braking force under any operating condition of the vehicle, that is, under any loaded or decelerating condition of the vehicle.

Referring to FIG. 3, the third embodiment of the brake pressure control unit 10' is shown as being substantially similar to the first embodiment except that the differential pressure valve 16' includes a modified actuator 140 which is formed with an axial bore 140a extending throughout the length thereof to provide communication between the chamber 84' on the right-hand side of the actuator 140 and a chamber 142 on the left-hand side of same. The chamber 142 is defined by the left-hand end of the actuator 140 and the blind bore 72'a of the closure member 72' and is variable in volume depending upon the axial movement of the actuator. Different from the first embodiment, the chamber 84' is communicated through the axial hole 140a and the chamber 142 with the storing chamber 44'. Except for the above modification, the actuator 140 is constructed substantially similarly to the actuator 70 of the previous embodiment. By the above modification, the actuator 140 is subjected at the opposed ends thereof to a fluid pressure of the same magnitude. Thus, by so designing that the opposed ends of the actuator 140 have the same sectional area, the forces resulting from the fluid pressure in the chambers 84' and 142 to act on the opposed ends of the actuator 140 can be counterbalanced at all times, thus allowing the actuator 140 to be free from the effect of the fluid pressure which is supplied through the chamber 84' to the storing chamber 44. That is, the actuator 140 is axially movable depending upon only the pressure difference between the first and second actuator chambers 76' and 78', viz., responsive only to the rate of increase of the master cylinder pressure Pm.

This embodiment can produce substantially the same effect as the first embodiment. Further, in this embodiment, the actuator 140 is assuredly prevented from being displaced by any force other than the force resulting from the pressure difference between the first and second actuator chambers 76' and 78', thus enabling the pressure differential valve 16' to operate so accurately as intended.

Referring to FIG. 4, the fourth embodiment of the brake pressure control unit 10' is shown as being substantially similar to the third embodiment except for the following structures. That is, the left-hand end of the differential pressure valve member 68' is sealingly and axially movably received in a partition member 144 and projects further leftwardly therefrom to have attached thereto a spring seat 146. Interposed between the spring seat 146 and the actuator 140 is a spring 80' which is set in a pre-loaded condition. The partition wall 144 cooperates with the larger diameter portion of the differential pressure valve member 68' to define therebetween a chamber 148 which is communicated through the passage 18'f with the storing chamber 44'. The partition member 144 also cooperates with the actuator 140 to define therebetween an air chamber 150 which is communicated with the open air through the axial hole 140a in the actuator 140 and the chamber 142 opening to the open air.

With the above structure, the differential valve 16' is adapted to supply to the storing chamber 44' such a pressure that is obtained not by the equation (4) but by the following equation:

$$Pf = (Pm \cdot A_3 - F')/(A_3 - A_4) \quad (5)$$

where $A_4$ is the sectional area of the bore of the partition member 144 through which the left-hand end of the differential pressure valve member 68' passes.

The differential pressure valve 16' in this embodiment can produce substantially the same effect as the third embodiment except that it supplies to the storing chamber 44' a pressure that is calculated by the equation (5) in place of the equation (4).

What is claimed is:

1. A brake pressure control unit of the deceleration-responsive type comprising:
   a housing having an inlet port and an outlet port;
   a control valve disposed in said housing between said inlet and outlet ports and operable to restrict the transfer of fluid pressure therethrough, said control valve having a spring by which it is biased to a position of opening;
   a storing chamber disposed in said housing and communicable with said inlet port, said storing chamber being variable in volume depending upon the variation of the fluid pressure supplied thereto and operatively connected to said control valve in a manner to urge the control valve in the direction to assist the bias of said control valve spring with an increasing force as the fluid pressure in the storing chamber increases;
   a deceleration-responsive valve disposed in said housing between said inlet port and said storing chamber and operable to sealingly close said storing chamber in response to a vehicle deceleration at a rate exceeding a predetermined value; and
   a differential pressure valve disposed in said housing between said deceleration-responsive valve and said storing chamber and operable to restrict the transfer of fluid pressure therethrough, said differential pressure valve having means for varying its valve opening pressure at which it opens to allow the transfer of fluid pressure therethrough in accordance with the variation of the rate of increase of the fluid pressure at said inlet port.

2. A brake pressure control unit of the deceleration-responsive type as set forth in claim 1, in which said differential pressure valve comprises a valve chamber constantly communicating with said storing chamber and communicable with said inlet port through said deceleration-responsive valve and a valve member having an end extending into said valve chamber and axially movable toward said valve chamber to a position of opening where it provides communication between said deceleration-responsive valve and said storing chamber and also axially movable away from said valve chamber to a position of closure where it obstructs communication between same, and said means comprises an actuator in the form of a stepped piston, axially movable toward and away from said valve member and having an end extending into said valve chamber, and a spring disposed within said valve chamber and interposed between said valve member and said actuator to urge same in opposite directions, said actuator being adapted to move increasingly toward said valve member, compressing said differential pressure spring, as the rate of increase of the fluid pressure at said inlet port increases.

3. A brake pressure control unit of the deceleration-responsive type as set forth in claim 2, in which said actuator comprises a larger diameter section and in which said differential pressure valve further comprises first and second actuator chambers on the respective sides of said larger diameter section, said first actuator chamber being communicated with said control valve while said second actuator chamber being communicated with said inlet port, said larger diameter section being formed with an orifice providing communication between said first and second actuator chambers, said orifice being adapted to cause such a pressure difference between said first and second actuator chambers that increases as the rate of increase of the fluid pressure at said inlet port increases.

4. A brake pressure control unit of the deceleration-responsive type as set forth in claim 3, in which said differential pressure valve further comprises a bimetal member which is mounted on said actuator in a manner to restrict the fluid flow through said orifice increasingly as the temperature of the fluid increases.

5. A brake pressure control valve of the deceleration-responsive type as set forth in claim 3, in which said actuator is adapted to be acted upon at the opposed axial ends thereof by such pressures that are counterbalanced.

6. A brake pressure control unit of the deceleration-responsive type as set forth in claim 5, in which said differential pressure valve further comprises a balancing chamber into which the other end of said actuator extends, said actuator having an axial hole extending throughout the length thereof to provide communication between said valve chamber and said balancing chamber, said valve chamber being in constant communication with said storing chamber through said axial hole and said balancing chamber.

7. A brake pressure control unit of the deceleration-responsive type as set forth in claim 6, in which the opposed ends of said actuator have the same sectional area.

8. A brake pressure control unit of the deceleration-responsive type as set forth in claim 3, in which said differential pressure valve further comprises a partition member separating said valve chamber into a pressure chamber section and an air chamber section, said one end of said valve member passing through said pressure chamber section to extend into said air chamber section while being sealingly and axially movably carried by said partition member, said pressure chamber section being an annular chamber around said valve member and constantly communicating with said inlet port through said deceleration-responsive valve, said one end of said actuator extending into said air chamber section, and in which said differential pressure valve further comprises an air balancing chamber which is in communication with the open air and into which said other end of said actuator extends, said actuator being formed with an axial hole extending throughout the length thereof to provide communication betwen said air chamber section and said air balancing chamber.

9. A brake pressure control unit of the deceleration-responsive type as set forth in claim 8, in which the opposed ends of said actuator have the same sectional area.

10. A brake pressure control unit of the deceleration-responsive type as set forth in claim 1, in which said control valve further comprises poppet valve means, a plunger axially movable to selectively open and close said poppet valve means and a piston axially aligned with said plunger and axially movable toward and away from said plunger, said control valve spring being interposed between said plunger and said piston to urge same in opposite directions, said piston having an end extending into said storing chamber and axially movable in response to the fluid pressure in the storing so that said plunger is biased by said control valve spring to its position of opening where it opens said poppet valve means with an increasing force as the increase of the storing chamber pressure increases.

11. A brake pressure control unit of the deceleration-responsive type as set forth in claim 1, in which said control valve further comprises poppet valve means, a plunger axially movable to selectively open and close said poppet valve means, said spring biasing said plunger to its position of opening, and a control valve chamber defined by said plunger, said control valve chamber being in constant communication with said storing chamber and adapted so that the fluid pressure therein urges said plunger to its position of opening where it opens said poppet valve means with increasing force as the storing chamber pressure increases.

* * * * *